US012190654B2

(12) United States Patent
Bolt et al.

(10) Patent No.: US 12,190,654 B2
(45) **Date of Patent: *Jan. 7, 2025**

(54) APPARATUSES, SYSTEMS, AND METHODS FOR REMOTELY CAPTURING AUTOMOTIVE VEHICLE DIAGNOSTIC INFORMATION, MONITORING, AND CONTROLLING

(71) Applicant: MAHLE International GmbH, Baden-Württembe (DE)

(72) Inventors: Louis Bolt, New Hudson, MI (US); Charles Kinkade, Warren, MI (US); Dustin Hoskins, Milford, MI (US); Chris Palmer, Westland, MI (US)

(73) Assignee: MAHLE International GmbH, Baden-Württemberg (DE)

( * ) Notice: Subject to any disclaimer, the term of this patent is extended or adjusted under 35 U.S.C. 154(b) by 912 days.

This patent is subject to a terminal disclaimer.

(21) Appl. No.: 17/317,268

(22) Filed: May 11, 2021

(65) Prior Publication Data

US 2021/0264698 A1 Aug. 26, 2021

Related U.S. Application Data

(63) Continuation of application No. 15/976,571, filed on May 10, 2018, now Pat. No. 11,024,102.

(51) Int. Cl.
*G07C 5/08* (2006.01)
*G07C 5/00* (2006.01)

(52) U.S. Cl.
CPC .......... *G07C 5/0808* (2013.01); *G07C 5/008* (2013.01)

(58) Field of Classification Search
None
See application file for complete search history.

(56) References Cited

U.S. PATENT DOCUMENTS

| | | | | |
|---|---|---|---|---|
| 9,613,472 | B2 | 4/2017 | Heine et al. | |
| 11,024,102 | B2 | 6/2021 | Bolt et al. | |
| 2013/0018677 | A1 | 1/2013 | Chevrette | |
| 2017/0024942 | A1 | 1/2017 | Drew et al. | |
| 2018/0047222 | A1* | 2/2018 | Lewis | G07C 5/008 |
| 2019/0347876 | A1 | 11/2019 | Bolt et al. | |

FOREIGN PATENT DOCUMENTS

| | | | | |
|---|---|---|---|---|
| CN | 1468409 | | 1/2004 | |
| CN | 202353707 U | * | 7/2012 | |
| CN | 104516344 | | 4/2015 | |
| EP | 2988278 A1 | * | 2/2016 | G07C 5/008 |

OTHER PUBLICATIONS

Office Action in European Appln. No. 19171787.5, dated Nov. 10, 2022, 7 pages.
Office Action in Chinese Appln. No. 201910299100.1, dated Oct. 24, 2023, 13 pages (with English summary).

* cited by examiner

*Primary Examiner* — Abdhesh K Jha
*Assistant Examiner* — Elizabeth Galyn Martinez
(74) *Attorney, Agent, or Firm* — Fish & Richardson P.C.

(57) ABSTRACT

The present disclosure provides systems and methods for remote vehicle diagnostics. The remote vehicle diagnostics are obtained based on a vehicle identification number for a vehicle connected to an electrical connector of a vehicle diagnostic system host device. A vehicle electronic configuration file is provided to the host device to control access to one or more vehicle control modules.

20 Claims, 14 Drawing Sheets

600

601 602 603 604

| PID ID | Generic PID Name | Description | Other Vehicle Information |
|---|---|---|---|
| 1 | ODO | Odometer, total vehicle distance | |
| 2 | OIL LIFE | Oil Life Remaining | |
| 3 | TIRE PRESSURE LF | Tire Pressure Monitor – Left Front (Wheel 1) | |
| 4 | TIRE PRESSURE RF | Tire Pressure Monitor – Right Front (Wheel 2) | |
| 5 | TIRE PRESSURE LR | Tire Pressure Monitor – Left Rear (outside) (Wheel 3) | |
| 6 | TIRE PRESSURE RR | Tire Pressure Monitor – Right Rear (outside) (Wheel 4) | |
| 7 | TIRE PRESSURE LRI | Tire Pressure Monitor – Left Rear inside (Wheel 5) | |
| 8 | TIRE PRESSURE RRI | Tire Pressure Monitor – Right Rear inside (Wheel 6) | |
| 9 | TIRE PRESSURE SPR | Tire Pressure Monitor – Spare | |
| 10 | SEATBELT D | Seatbelt Status - Driver | |
| 11 | SEATBELT P | Seatbelt Status – Front Passenger | |
| 12 | FUEL LEVEL | Fuel Level | |
| 13 | AIRBAG LAMP | Airbag Lamp Status | |
| 14 | PRNDL POS | PRNDL position | |
| 15 | PARKING BRAKE STAT | Parking Brake Status | |
| 16 | PARKING BRAKE LAMP | Parking Brake Lamp Status | |

FIG. 6

APPARATUSES, SYSTEMS, AND METHODS FOR REMOTELY CAPTURING AUTOMOTIVE VEHICLE DIAGNOSTIC INFORMATION, MONITORING, AND CONTROLLING

CLAIM OF PRIORITY

This application claims priority under 35 USC § 119(e) to U.S. patent application Ser. No. 15/976,571, filed on May 10, 2018, the entire contents of which are hereby incorporated by reference.

TECHNICAL FIELD

The present application relates generally to the field of automotive vehicle diagnostic systems.

BACKGROUND

Advanced vehicle diagnostics systems permit mechanics and technicians to access and diagnose vehicle systems. Some of these advanced vehicle diagnostic systems are implemented via tools that plug into the vehicle on-board diagnostic (OBD) port. These tools can communicate with one or more local computers or stations to analyze diagnose and repair a vehicle. These systems are generally suited for use by advance technicians. These systems implement analysis of large database subscriptions that can be stored, for example, on the local computers or stations. Accordingly, these tools permit a technician to take a deep dive into the fault codes and technical information about the vehicle.

Because these systems are designed for use by advanced technicians, they are configured for local use and provide technical details in the diagnostics that would generally be too sophisticated for an average driver. The memory storage requirements for such tools make them prohibitive for real-time remote diagnostics. Additionally, the sophistication of the analysis provided by such tools warrant local diagnostics and repairs so that the large database subscriptions that facilitate the use of such systems are readily accessible.

SUMMARY

The inventors have appreciated that various embodiments disclosed herein provide apparatuses, systems, and methods for remotely obtaining diagnostic status information and/or performing output controls on a vehicle. The remote vehicle diagnostics are obtained based on a vehicle identification number for a vehicle connected to an electrical connector of a vehicle diagnostic system host device. A vehicle electronic configuration (VEC) file is provided to the host device remotely to selectively control and facilitate access to one or more vehicle control modules particular to the vehicle or vehicle platform. The VEC file is provided to the host device and or updated post engagement to improve the energy storage requirement on the device.

This specification uses the term "configured" in connection with systems, apparatuses, and computer program components. For a system of one or more computers to be configured to perform particular operations or actions means that the system has installed on it software, firmware, hardware, or a combination of them that in operation causes the system to perform the operations or actions. For one or more computer programs to be configured to perform particular operations or actions means that the one or more programs include instructions that, when executed by a data processing apparatus(s), cause the apparatus(s) to perform the operations or actions. For special-purpose logic circuitry to be configured to perform particular operations or actions means that the circuitry has electronic logic that performs the operations or actions.

The foregoing and other embodiments can each optionally include one or more of the following features, alone or in combination.

Various embodiments provide vehicle diagnostic systems including a housing structure, an electrical connector that is at least one of coupled to and extending from a portion of the housing structure and one or more computers and one or more storage devices positioned in the housing structure and communicably coupled to the electrical connector. The one or more storage devices include stored instructions that are operable, when executed by the one or more computers, to cause the one or more computers to perform operations. The stored instructions can be configured as a NanoKernel Application or NanoKernel firmware. The operations include determining a vehicle identification number (VIN) for a vehicle connected to the electrical connector. The operations include causing a request including the VIN to be transmitted to a remote server system. The operations include receiving, at the one or more storage devices and in response to transmission of the request to the remote server system, a vehicle electronic configuration (VEC) file generated or obtained based, at least in part, on the vehicle identification number. The operations include identifying, via the vehicle electronic configuration file, a parameter identification (PID) code, in response to receiving a generic request for vehicle operational data. The operations include determining a vehicle control module to access based on the PID code identified. The operations include obtaining the vehicle operational data from the vehicle control module based on the PID code identified. In some implementations, the generic request can be provided to the NanoKernel Application by a partner application or host application stored and/or operating on the one or more storage devices. In some implementations, the partner application can generate the generic request responsive to a query or request received from a remote server (i.e., remote from the vehicle diagnostic system housing structure).

In some implementations, the stored instruction are further operable when executed by the one or more computers, to cause the one or more computers to perform operations comprising causing the vehicle operational data to be transmitted to the remote server system.

In certain implementations, the connector device comprises an on-board diagnostic (OBD) connector.

In particular implementations, the stored instruction are further operable when executed by the one or more computers, to cause the one or more computers to perform operations comprising causing an output command to be sent to the vehicle control module.

In some implementations, the stored instructions are stored in 100 kb or less of memory on the one or more storage devices.

In certain implementations, the stored instructions are stored in 64 kb or less of memory on the one or more storage devices.

In particular implementations, the one or more storage devices comprising stored instructions that are operable, when executed by the one or more computers, to cause the one or more computers to perform operations further comprising storing the VEC file on the one or more storage devices.

In some implementations, the VEC file is configured to be engaged with an operating system stored on the one or more storage devices and to engage the vehicle control module via a vehicle communication interface (VCI), so as to obtain the vehicle operational data and store the vehicle operational data on at least one of the one or more storage devices.

In certain implementations, the VEC file is a first VEC file and further comprises replacing the first VEC file stored on the one or more storage devices with a second VEC file distinct from the first VEC file, in response to detection of a new VIN.

In particular implementations, replacing the first VEC file stored on the one or more storage devices with the second VEC file in response to at least one of a change in the VIN.

In some implementations, the VEC file comprises a binary file.

In certain implementations, the VEC file comprises strings and logic for a plurality of parameter identification (PID) codes, wherein the identified PID code is selected from the plurality of PID codes.

In particular implementations, the VEC file comprises the information for all possible modules that may be on that vehicle (e.g., body control module, powertrain control module, etc). The information can include: a module ID for system, a module protocol or special configuration (e.g., information on how to resolve a protocol in the VEC file, specific BUS speeds; bit timings, ISO 14229; ISO 15765; Keyword Protocols; OBD II, etc.), physical/transport layer, a CAN, a UART, a serial protocol, data addresses; request for the data at address, an address for engine RPM and/or vehicle speed, conversions, scaling factors for the data (e.g., temperature in degrees in Fahrenheit or Celsius), logic for selecting exact module to use, an ECU ID, and all possible data items—logic for selecting the correct data.

In some implementations, the request comprises a device identification number for the vehicle diagnostic system.

Various embodiments provide methods of obtaining vehicle diagnostic data. The methods include determining a vehicle identification number (VIN) for a vehicle connected to an electrical connector of a vehicle diagnostic system. The methods include causing a request including the VIN to be transmitted from the vehicle diagnostic system to a remote server system. The methods include receiving, at the vehicle diagnostic system in response to transmission of the request, a vehicle electronic configuration (VEC) file based, at least in part, on the VIN. The methods include identifying, via the VEC file, a parameter identification (PID) code, in response to receiving a generic request for vehicle operational data. The methods include determining a vehicle control module to access based on the PID code identified. The methods include obtaining the vehicle operational data from the vehicle control module based on the PID code identified.

In certain implementations, the stored instruction are further operable when executed by the one or more computers, to cause the one or more computers to perform operations comprising causing the vehicle operational data to be transmitted to the remote server system.

In some implementations, obtaining the vehicle operational data comprises obtaining a diagnostic trouble code (DTC).

In particular implementations, identifying the PID code in response to receiving the generic request comprises mapping one or more words in the generic request to a PID name.

In certain implementations, identifying the PID code in response to receiving the generic request comprises scanning a lookup table including a plurality of PID codes.

In some implementations, the PID code corresponds to at least one of vehicle odometer reading, oil life, tire pressure, seatbelt status, fuel level, airbag status, transmission gear position, brake status, vehicle speed and engine speed.

In particular implementations, identifying the PID code in response to receiving the generic request comprises resolving a list of standardized terms in the generic request and mapping a standardized term in the list of standardized terms to a PID code selected from a plurality of PID codes.

In certain implementations, mapping the standardized term to a PID code selected from a plurality of PID codes comprises analyzing the generic request with a string-searching algorithm.

In some implementations, mapping the standardized terms to a PID code selected from a plurality of PID codes comprises analyzing the generic request with a pattern recognition algorithm.

In particular implementations, the method includes storing the VEC file on the one or more storage devices.

In certain implementations, the VEC file is a first VEC file and further comprising replacing the first VEC file stored on the one or more storage devices with a second VEC file distinct from the first VEC file.

In some implementations, replacing the first VEC file stored on the one or more storage devices with the second VEC file is responsive to detecting at least one of a change in the VIN.

Particular embodiments provide methods of obtaining vehicle diagnostic data. The methods include determining a vehicle identification number (VIN) for a vehicle connected to an electrical connector of a vehicle diagnostic system. The methods include causing a request including the VIN to be transmitted from the vehicle diagnostic system to a remote server system. The methods include receiving, at the vehicle diagnostic system and in response to transmission of the request, a vehicle electronic configuration (VEC) file based, at least in part, on the VIN. The methods include identifying, via the VEC file, a vehicle control module to access based on a generic request for a vehicle output control command received.

In particular implementations, the methods include accessing the vehicle control module to cause the vehicle output control command to be initiated.

In certain implementations, the methods include obtaining a value for at least one vehicle parameter in response to completion of the vehicle output control command.

In some implementations, the methods include storing bytes of unprocessed data obtained from the vehicle control module in response to accessing the vehicle control module.

Particular embodiments provide one or more computer-readable storage media encoded with instructions that, when executed by one or more computers, cause the one or more computers to perform operations. The operations include determining a vehicle identification number (VIN) for a vehicle. The operations include causing a request including the VIN to be transmitted from the vehicle diagnostic system to a remote server system. The operations include receiving, at the vehicle diagnostic system in response to transmission of the request, a vehicle electronic configuration (VEC) file generated based, at least in part, on the VIN. The operations include identifying, via the VEC file, a parameter identification (PID) code, in response to receiving a generic request for vehicle operational data. The generic request can be generated by a partner application or host application residing on the one or more computer readable storage media. The operations include determining a vehicle control module to access based on the PID code identified. The operations include obtaining the vehicle operational data from the vehicle control module based on the PID code identified.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 6 illustrates a PID lookup table mapping codes and descriptions for use by a vehicle diagnostic system of FIG. 4.

The features and advantages of the inventive subject matter disclosed herein will become more apparent from the detailed description set forth below when taken in conjunction with the drawings.

DETAILED DESCRIPTION

Following below are more detailed descriptions of various concepts related to, and exemplary embodiments of, inventive systems, methods and components for remotely obtaining diagnostic status information and/or performing output controls on a vehicle.

Figure 1A:
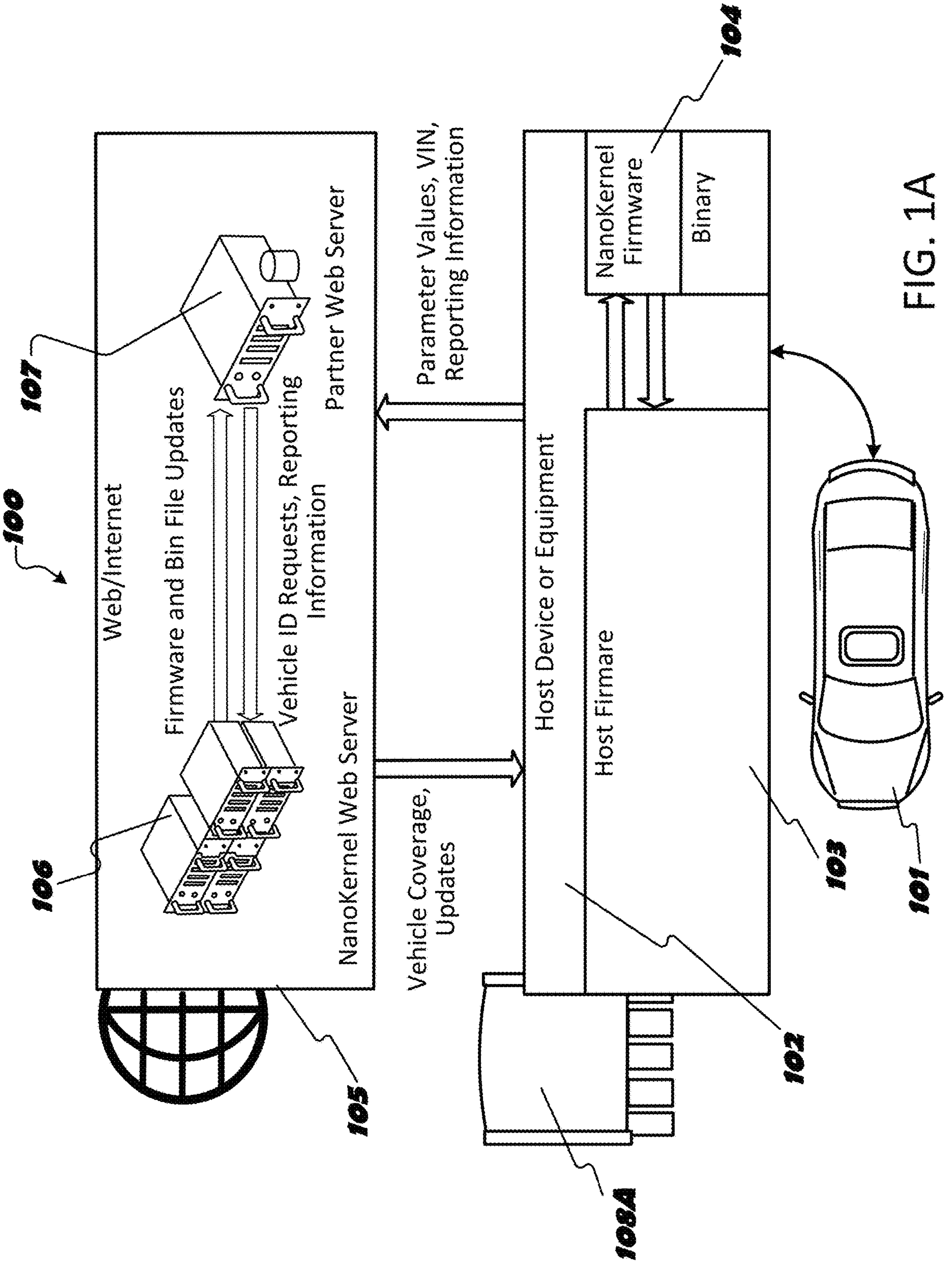
FIG. 1A is a schematic of the system architecture for a vehicle diagnostic system.

FIG. 1A is a schematic of the system architecture for a vehicle diagnostic system. The vehicle diagnostic system 100 can be deployed to allow parties to remotely diagnosis the system status of various components of a vehicle 101. The remote diagnosis can include a system status indication or value and/or a control command, as described in further detail herein. In particular embodiments, a host device 102 is physically connected to the vehicle 101, for example via an on-board diagnostic (OBD) port of the vehicle. The OBD port allows the host device 102 to be communicably coupled to one or more vehicle control units of the vehicle. The host device 102 can run one or more operating systems (e.g., Linux) and one or more applications 103. The host device 102 can have a NanoKernel Application 104 installed on the device 102. The NanoKernel Application 104 will reside embedded on-board a memory storage device of the host device 102. The NanoKernel Application 104 is configured to interface with the OS and partner application(s) 103. When the host device 102 is connected to the vehicle 101, the NanoKernel Application 104 enables the host device 102 to search and discover certain information from the vehicle. The ability to search and discover information from the vehicle 101 is predicated on first obtaining information about the specific vehicle 101 with which the host device is connected. The information obtained from the vehicle 101 via the host device 102 can be passed to one or more memory storage devices on the host device 102. The information can be transmitted to one or more cloud based systems 105 remote from the vehicle 101, for example an internet network. The cloud-based systems 105 includes a NanoKernel Web Server 106 and can include a customer database 107. The cloud based systems 105 can include a plurality of servers communicably coupled to one another. The information from the vehicle can be used to diagnose a particular function of the vehicle 101 and/or to change or control certain functions of the vehicle 101 where the diagnosis and control are specified for the particular vehicle 101. As described in further detail herein, the nanokernel web server 106 can provide information to the host device 102 that allows the host device to obtain particular information from the vehicle 101. The information from multiple vehicles 101 can be assimilated in a customer database 107 in the cloud based systems 105.

In some implementations, the information obtained by the host device 102 from the vehicle 101 can include bytes of unprocessed data obtained by the NanoKernel Application 104 and transmitted from the host device 102 to the one or more cloud based systems 105 or to a customer application also residing on the host device 102. The bytes of data can include parameter identification (PID) codes, values for the PID codes, and/or diagnostic trouble code (DTC). On-board diagnostic PIDs codes are used to request data from a vehicle and are used as a diagnostic tool. The unprocessed data obtained by the NanoKernel Application 104 on the host device 102 can be transmitted to the one or more cloud-based systems 105 and processed via the master web kernel 106 based on vehicle information about the vehicle 101 obtained via the NanoKernel Application 104. Accordingly, the NanoKernel Application 104 can meet low memory storage requirements since the NanoKernel Application 104 excludes additional information and a more full diagnostic database that facilitates processing the unprocessed data.

Figure 1B:
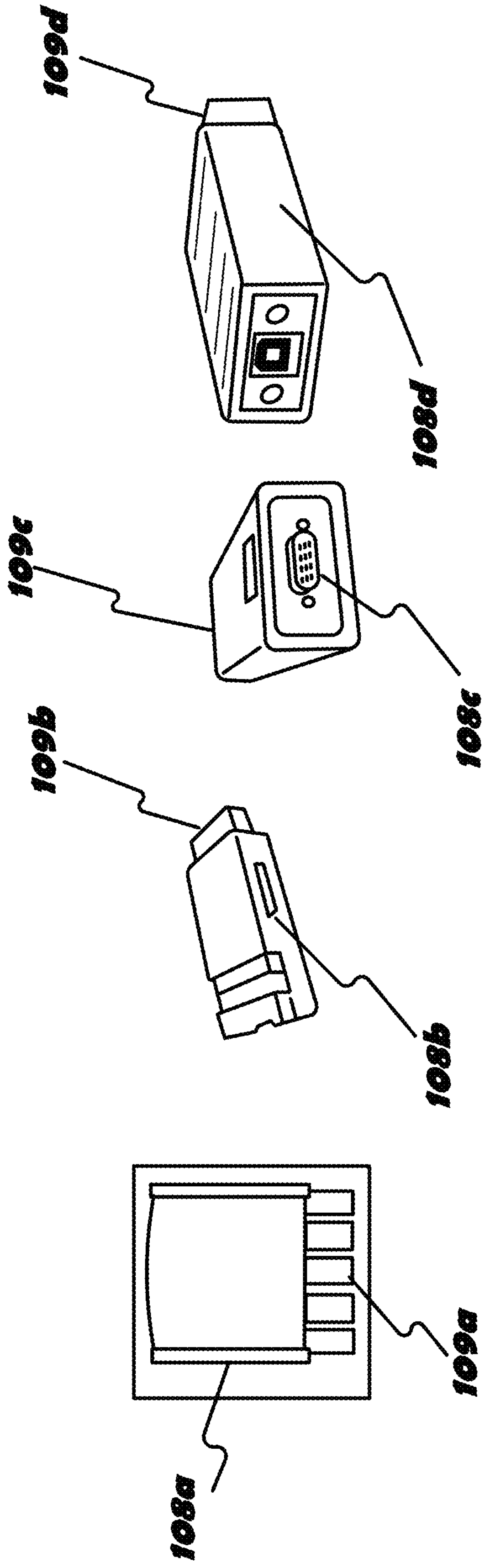
FIG. 1B shows housing structures for a host device of the vehicle diagnostic system.

FIG. 1B shows housing structures for a host device of the vehicle diagnostic system. Each of the housing structures 108*a*-108*d* includes an electrical connector 109*a*-109*d* for connecting the host device 102 to a port in the vehicle 101. In certain embodiments, the electrical connectors 109*a*-109*d* include an OBD or OBDII connector. The electrical connector facilitates wired communication between the various control units of the vehicle such as the engine control unit (ECU) and one or more computers and one or more storage devices positioned in the housing structure (e.g., 108*a*-108*d*) of the host device 102. The one or more storage devices include stored instructions that are operable, when executed by the one or more computers, to cause the one or more computers to perform operations of the vehicle diagnostic system discussed in further detail herein. The housing structures 108*a*-108*d* can include other electrical connectors that allow the device to be also connected to a computer or other device. The housing can also house one or more status lights. The housing can include an indentation or grove to facilitate easily removing the housing structure from the OBD port. The low memory storage requirements of the host device 102 allow the device to be packaged in a smaller and discrete form factor that promotes remote use of the device (e.g., when the vehicle is in transit).

Figure 2A:
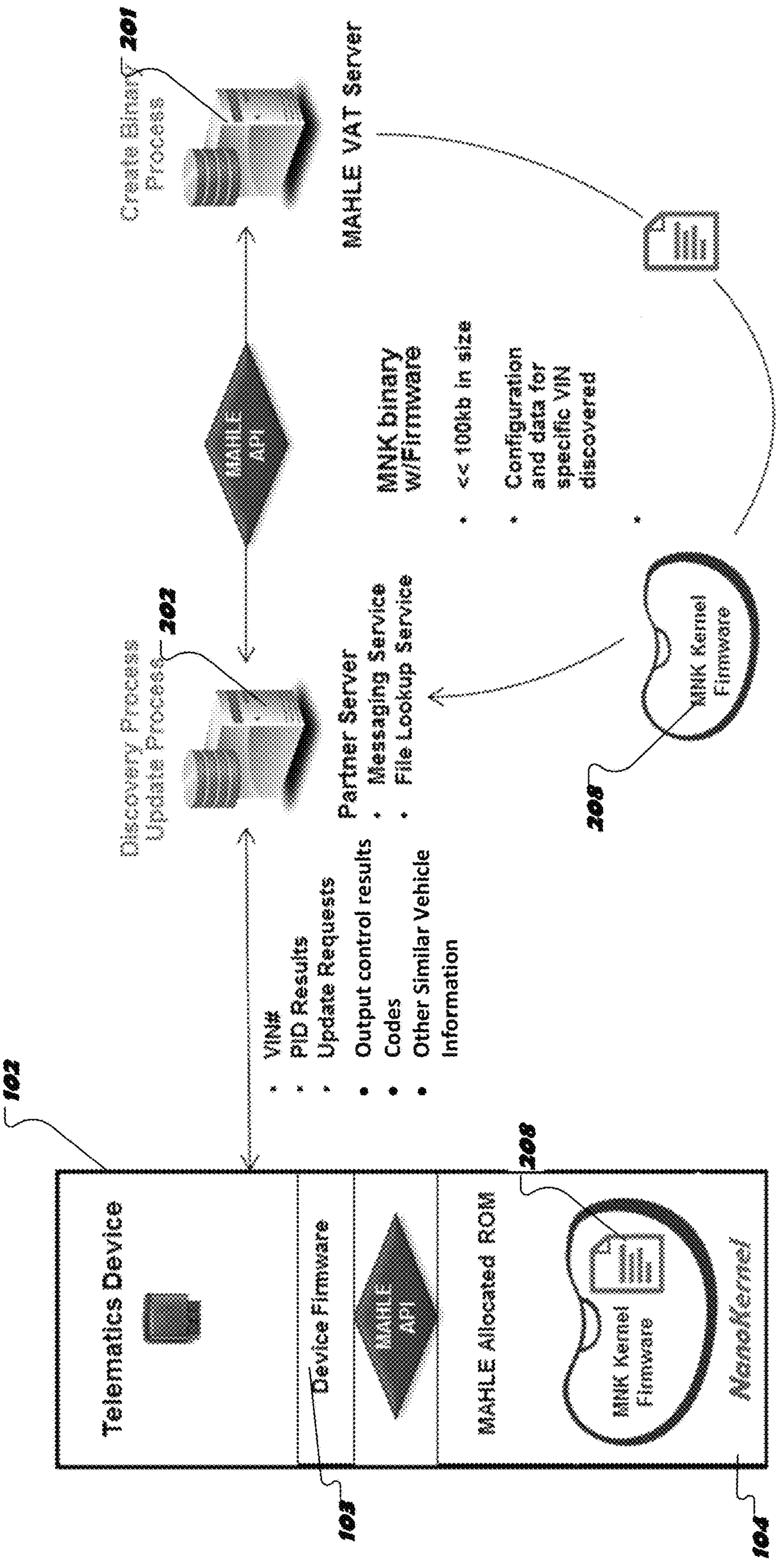
FIGS. 2A and 2B are system diagrams showing operations of a vehicle diagnostic system.
Figure 2B:
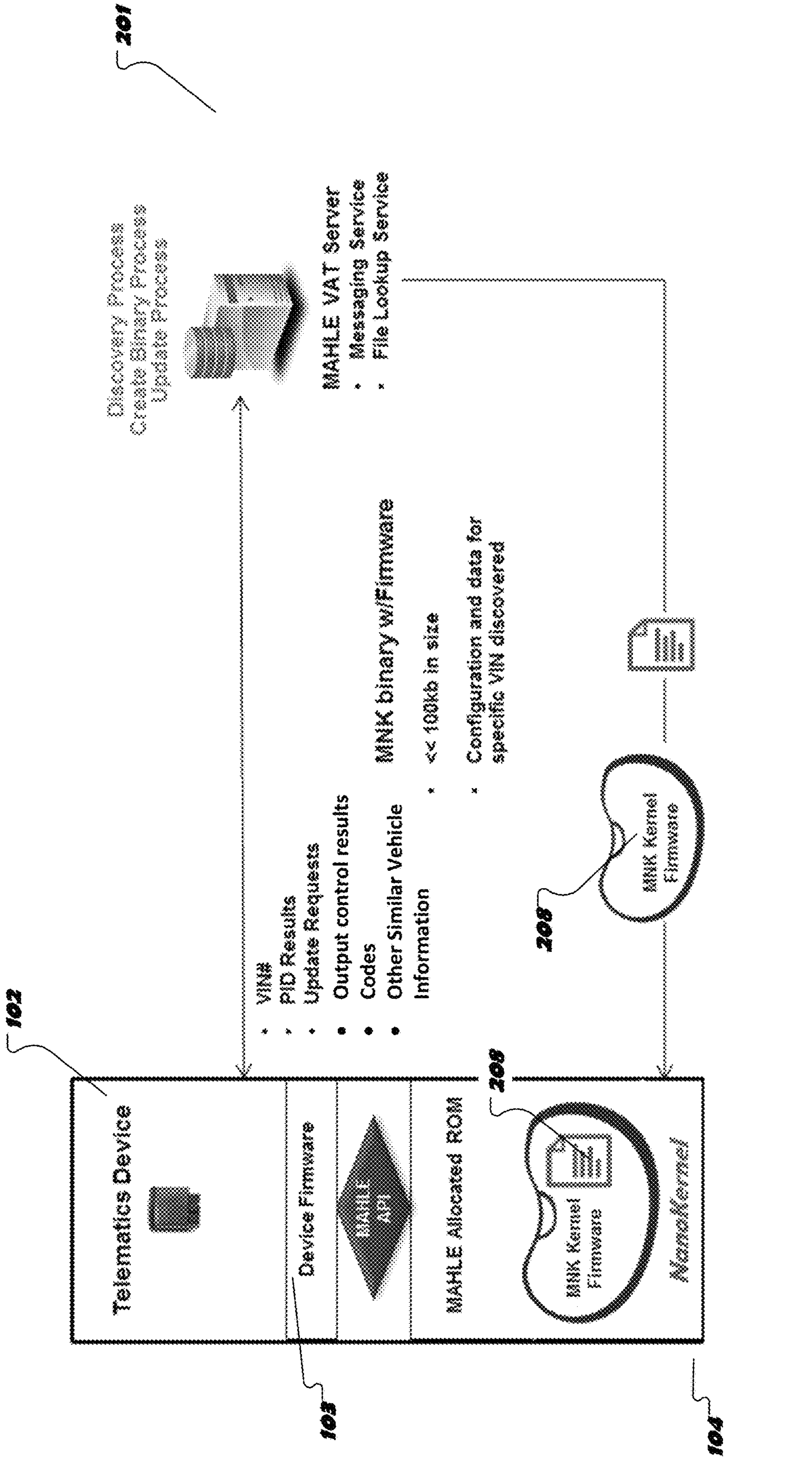

FIGS. 2A and 2B are system diagrams showing operations of a vehicle diagnostic system. In accordance with particular embodiments, when the host device 102 is plugged into the vehicle 101 for the first time, at vehicle startup, and/or after being disconnected from a vehicle and subsequently reconnected (i.e., if the host device 102 is unplugged, it can be configured to loses its programming (e.g. the VEC file can be automatically erased) and must be re-programmed) the host device 102 initiates a discovery process (e.g., initiated via the partner application or host application 103; e.g., responsive to the absence of a VEC file). Through this discovery process, the host device transmits information to a first server system, a service provider or partner server 202. The information transmitted to the first server system 202 from the host device 102 during the discovery process can include a vehicle identification number (VIN) for the vehicle 101 and a device identification number for the host device 102. In particular implementations, the NanoKernel Application 104 can run a routine on the host device 102 responsive to each vehicle start up (ignition) to determine if the VIN for the vehicle 101 that is connected to the host device 102 corresponds to the last VIN number saved on the host device 102. If the VIN is different and the partner application 103 requests diagnostic information, the NanoKernel Application 104 will reply to inform the host device 102 that vehicle 101 is a different vehicle 101 or a new vehicle and informing the host device 102 that a discovery process needs to be performed. This routine prevents the host device 102 from trying to run a diagnostic on a vehicle for which it has not yet been configured. If the VIN matches, the host device 102 is ready for remote diagnostics. The ready state may be indicated on the host device 102 via one or more light indicators (e.g., an LED status light). The ready state may also be communicated to the service provider server 202. The discovery process can cause the service provider server 202 to communicate with a diagnostic server system 201, which includes a VAT server system in particular embodiments. The diagnostic server system 201 operates the NanoKernel Web Server, which is the primary vehicle diagnostic system, such as MAHLE's Techpro system. The service provider (e.g., host or partner) server 202 that communicates directly with the host device 102, provides the VIN number to the diagnostic server system 201. The diagnostic server system 201 identifies the vehicle architecture via the VIN number, and replies to the partner server 202 with the VEC file that is to be used for than VIN. The vehicle architecture identified is used to build a binary file 208 for the NanoKernel Application 104. In particular embodiments, the binary file 208 takes up less than 100 kb of memory (e.g., 64 kb or less). If the vehicle 101 is supported, the binary file 208 is transmitted from the NanoKernel Web Server 201 to the partner server 202 for uploading to the host device 102. The binary file 208 includes a vehicle electronic configuration (VEC) file configured as a bin file and created via processes 204-206. The VEC file comprises strings and logic for a plurality of parameter identification (PID) codes. In some implementations, the VEC file comprises the information for all possible modules that may be on that vehicle (e.g., body control module, powertrain control module, etc.). The information can include: a module ID for system, a module protocol or special configuration (e.g., information on how to resolve a protocol in the VEC file, specific BUS speeds; bit timings, ISO 14229; ISO 15765; Keyword Protocols; OBD II, etc.), physical/transport layer, a CAN, a UART, a serial protocol, data addresses; request for the data at address, an address for engine RPM and/or vehicle speed, conversions, scaling factors for the data (e.g., temperature in degrees in Fahrenheit or Celsius), logic for selecting exact module to use, an ECU ID, and all possible data items—logic for selecting the correct data. The diagnostic server system 201 uses the VIN number provided to obtain, the NanoKernel binary file 208 created based on the logic identified for the vehicle's PIDS and based on the associated processes. The bin file 208 is transmitted from the master vehicle diagnostic server system 201 to the service provider server 202 and then to the host device 102. The bin file 208 provides a script for accessing various vehicle control units via the host device 102 based on the specific vehicle and the specific device. The bin file 208 is processed via the NanoKernel Application 104 and executed via the OS and one or more partner applications 103 running on the host device 102. The bin file 208 is used by the host device 102, by the NanoKernel Application 104 in particular, to map particular request received from the device firmware 103 (for example generated at the service provider server 202) into commands or information request that the host device 102 can access based on information obtained from the bin file 208. For example, a user remote from service provider server 202 and remote from vehicle 101/host device 102 can access the server 202 via a mobile electronic device, such as a smart phone or tablet, and request information such as engine speed in a generic request that the NanoKernel Application 104 can map to a request for specific vehicle operational data or values. The service provider server 202 transmits the request to the host device 102, where it relayed by the device firmware 103 to the NanoKernel Application 104 and mapped by the NanoKernel Application 104 into a request for a particular PID using the binary file 208. The NanoKernel Application 104, in response, causes the host device 102 to access the appropriate control unit of the vehicle to obtain data corresponding to the particular PID. The information obtained can be transmitted from the host device 102 to the service provider server system 202 and to the user.

The system shown in FIG. 2B can obtain the same information as FIG. 2A, but is different in that rather than obtaining information secondarily via a partner server and rather than sending the binary file obtained for the host device 102 secondarily via the partner server, the diagnostic server communicates directly with the host device 102.

One or more of the computers or processors in the host device 102 may include wireless links for communication with one or more remote electronic device such as a server, another computing device, a mobile phone, a tablet, a laptop. The wireless links may include BLUETOOTH classes, Wi-Fi, Bluetooth-low-energy, also known as BLE, 802.15.4, Worldwide Interoperability for Microwave Access (WiMAX), an infrared channel or satellite band. The wireless links may also include any cellular network standards used to communicate among mobile devices, including, but not limited to, standards that qualify as 1G, 2G, 3G, 4G, or 5G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

Figure 3A:
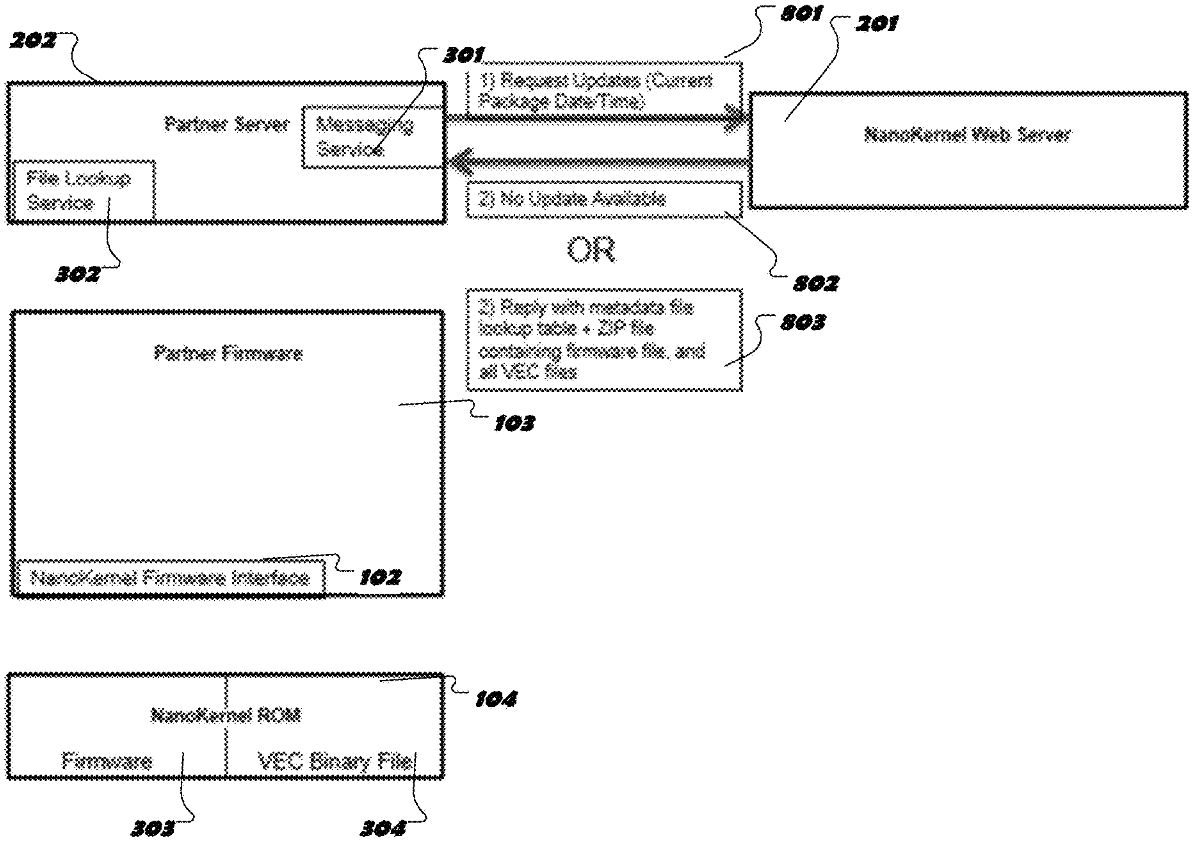
FIGS. 3A and 3B shows the system architecture at a server update interphase when a partner server is updated with VEC files.
Figure 3B:
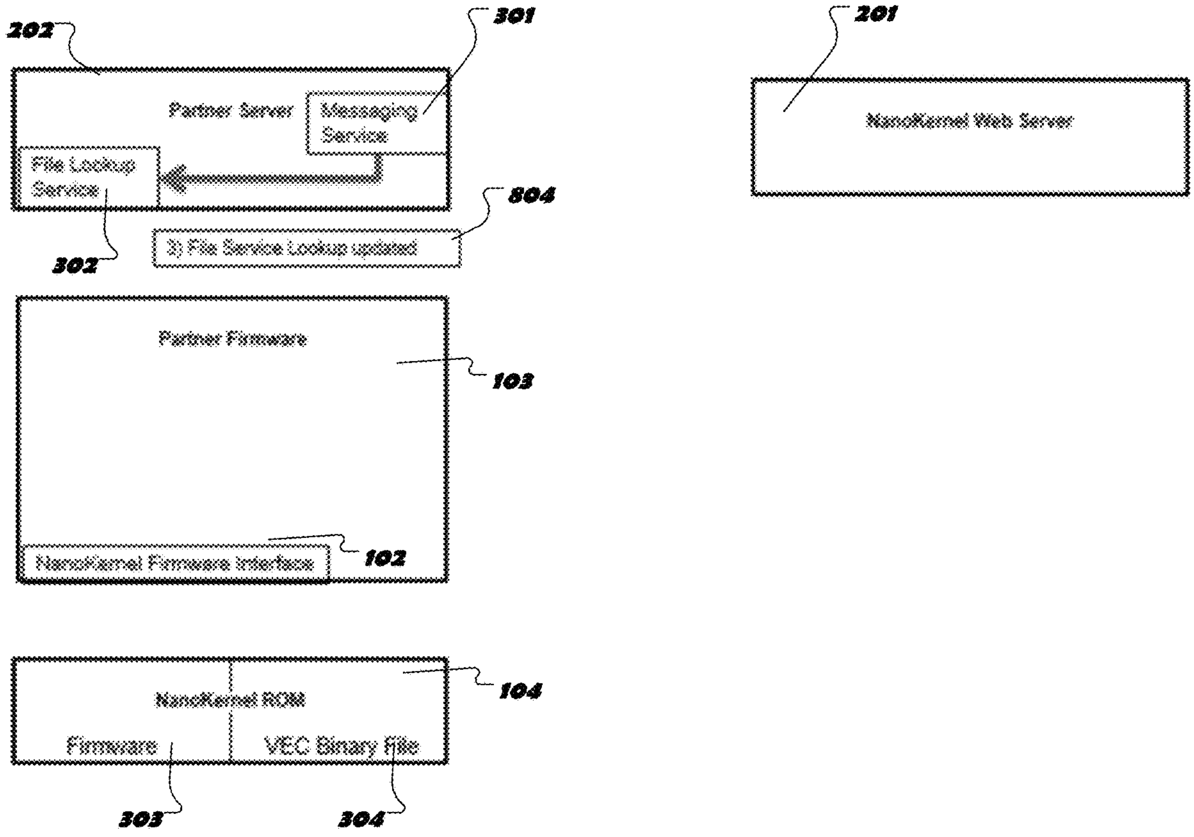

FIG. 3A-3B shows the system architecture at a server update interphase when a server system is updated with VEC files. In certain implementations, data in the server system 202 can be updated independently of a request from a host device. For example, if the master server 201 has an update for a VEC file before a host device inquires about an update, the diagnostic server system 201 can push the updated file out to the master server for a vehicle with VIN number that had previously requested a VEC file. As such, as shown in FIG. 8A, the service provider server 202 can pole the master server 201 periodically for updates 801 providing information such as the date and time that a particular VEC file was last updated. The diagnostic server system 201 can either confirm that this is the latest version by indicating at 802 that no updates are available or the NanoKernel Web Server/diagnostic server system 201 can provide the updated VEC file at 803 if the date of last update fails to correspond to the most recent version of the VEC file. As shown in FIG. 3B, if an updated file is available the file will be generated and the file service lookup 302 will be updated with the updated file 804 that the host device 102 can access in the future once it checks the service provider server 202 for an updated file.

Figure 4:
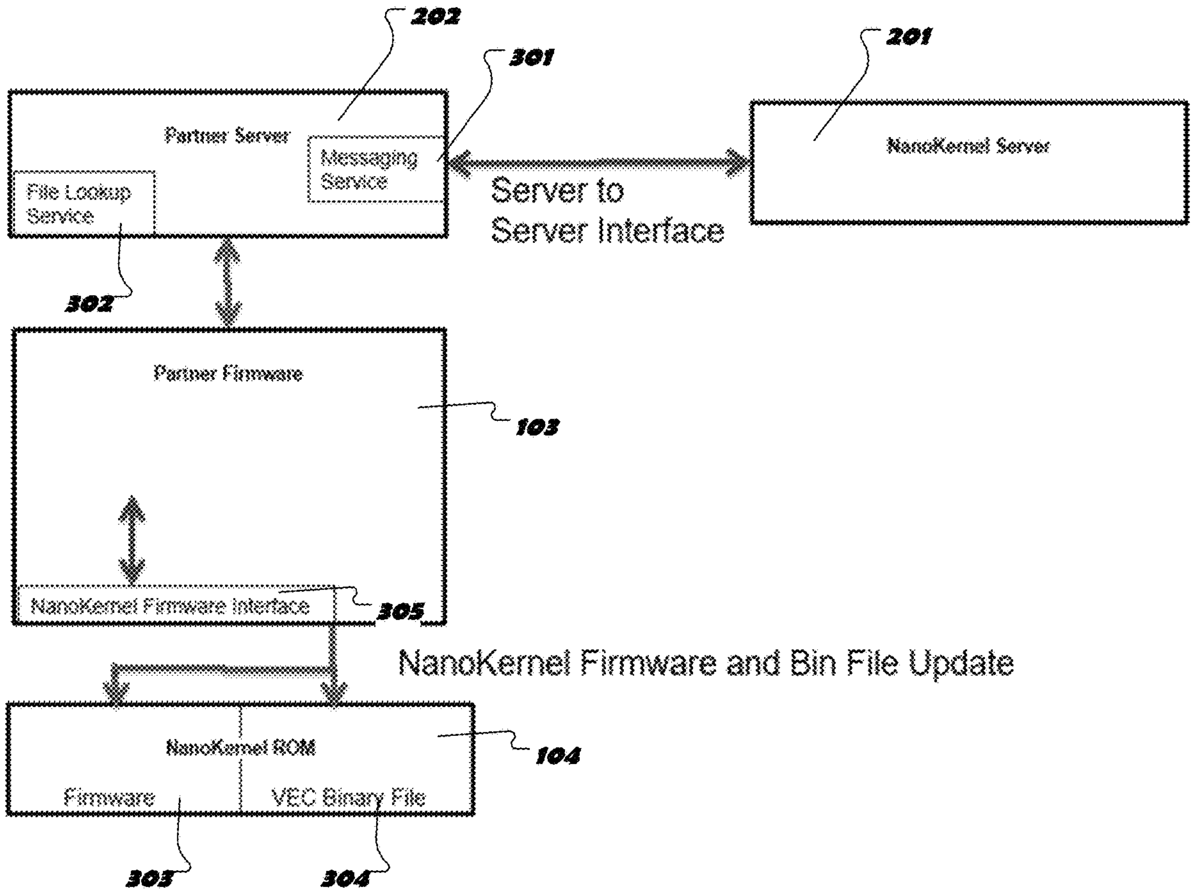
FIG. 4 shows the system architecture for a vehicle diagnostic system.

FIG. 4 shows the system architecture for a vehicle diagnostic system. As illustrated in FIG. 4, the service provider server 202 includes a messaging service 301 for communicating with the master vehicle diagnostic server 201 and the host device 102. The service provider server 202 also includes a file lookup service 302 for obtaining files for the host device 102. As demonstrated in FIG. 4, the host device 102 includes firmware 103 associated with the service provider, which operates as an application running in the OS on the device. This application includes an interface 305 for engaging the firmware 303 of the NanoKernel Application 104. The NanoKernel Application 104 includes the firmware file 303 and a bin file 304. The bin file 304 is updated and/or sent for the first time to the device 102 in response to the discovery request described in FIGS. 2A and 2B. The firmware file 303 processes the bin file 304 to obtain specific information. For example, in response to a request, the firmware file 303 calls specific execution routines. The execution routine may require accessing a list of parameters or commands contained in the binary file 304. The application 103 obtains the specific information via the master firmware interface and transmits the information to the service provider server 202. Similarly, during an initiation, the bin file 304 is obtained or updated through the application 103 from service provider server 202.

Figure 5A:
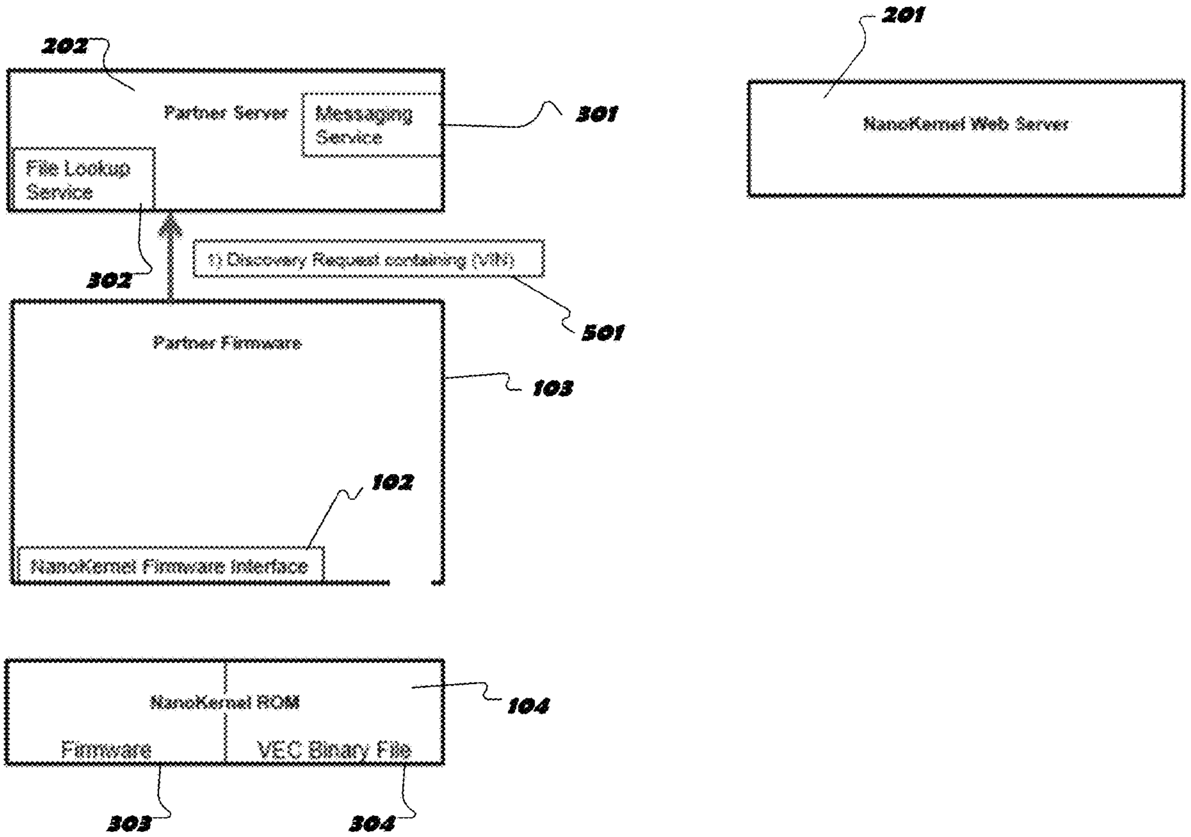
FIG. 5A-5C show the system architecture of FIG. 4 at an install interphase.
Figure 5B:
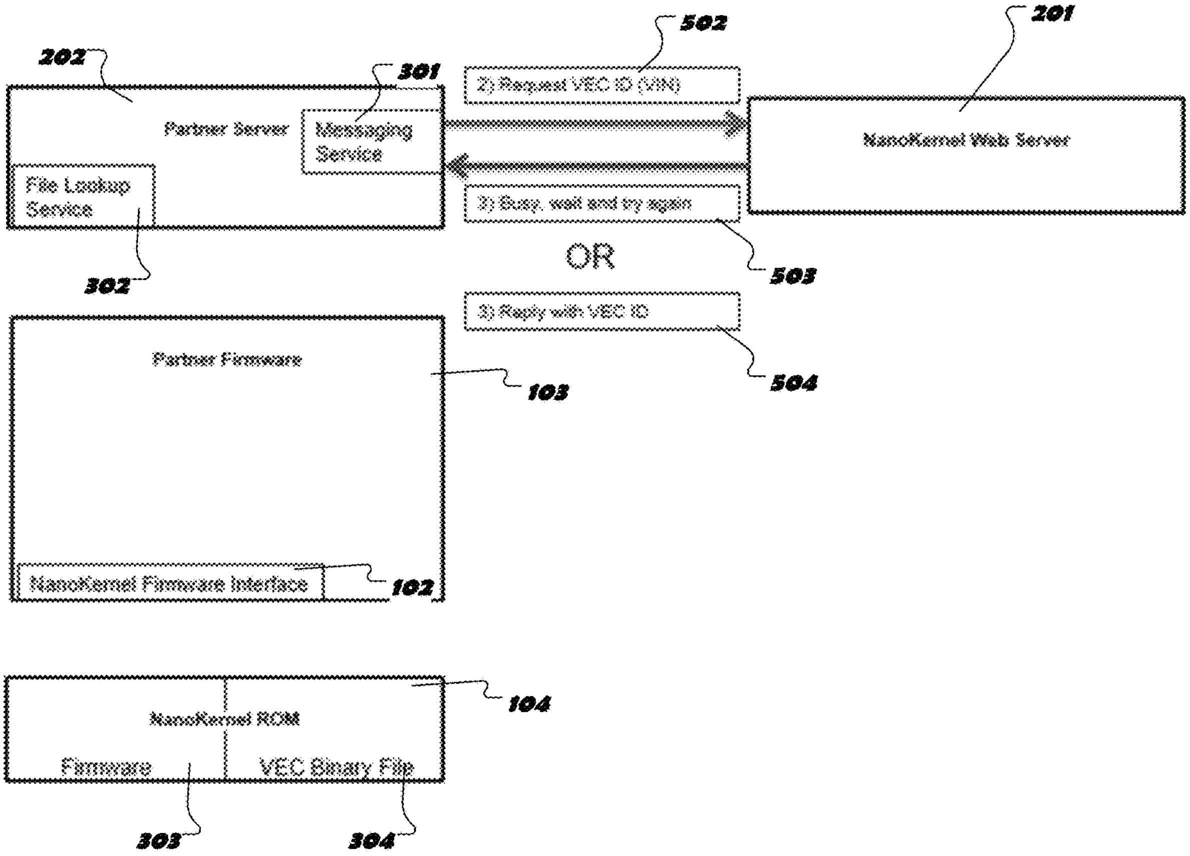
Figure 5C:
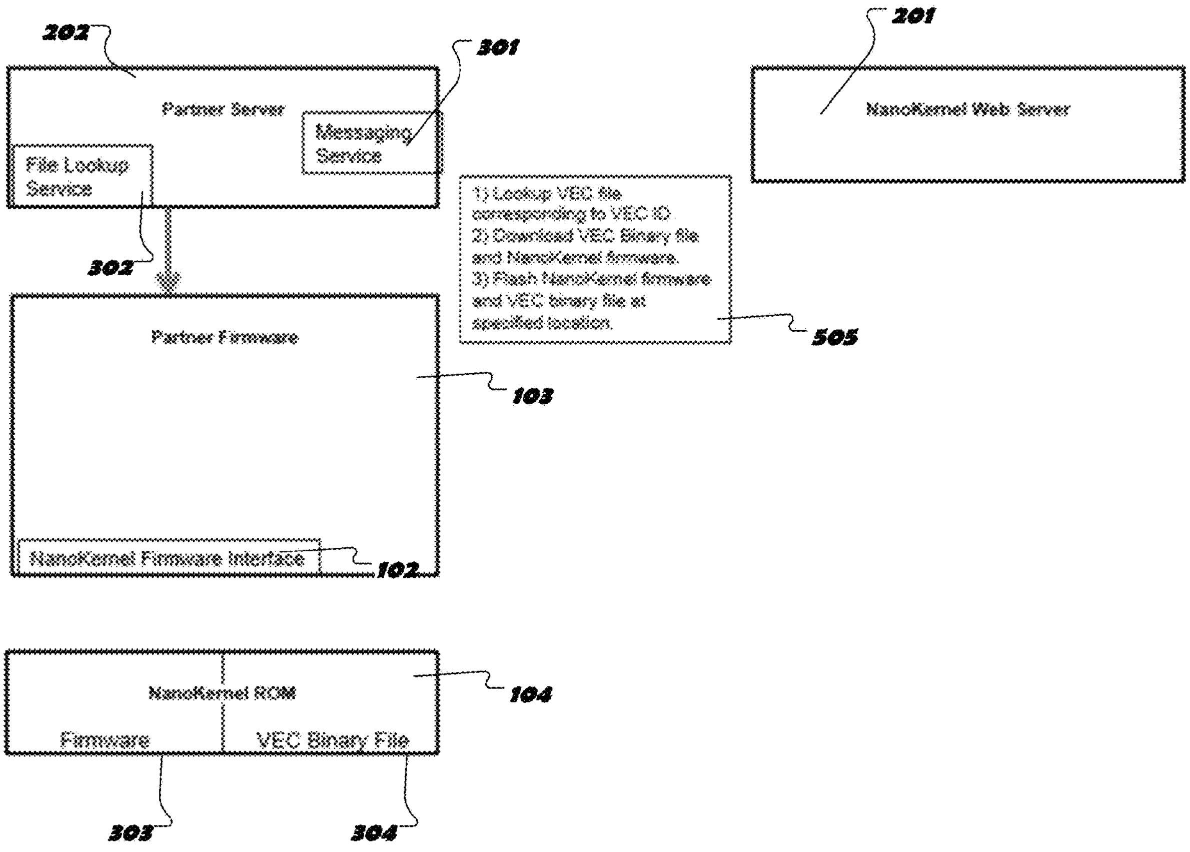

FIG. 5A-5C show the system architecture of FIG. 4 at an install interphase. At startup and/or whenever the host device 102 is disconnected, one of the NanoKernel Application 104 and the partner application 103 checks the VIN number to determine if this is the first time being installed into a vehicle, or if the device has been installed into a new vehicle. If no bin file 304 is available or if the NanoKernel Application 104 detects a mismatch (for example because the host device 102 is connected to a new vehicle), then the NanoKernel Application 104 causes the firmware to transmit the VIN number of the current vehicle to the service provider server 202 to request a VEC ID file from the service provider server 202. In certain embodiments, the VEC ID file may already be stored on the service provider server, for example if the VIN number has already been uploaded, but the an update to the VEC ID file has been obtained, but not yet uploaded to the host device 102. As shown in FIG. 5B, the host or partner server 202 requests the VEC ID from the NanoKernel Web Server 201 with a request 502 including the VIN. If the VIN is supported a reply 504 will be sent to the partner server 202 that contains the VEC ID. The partner server 202 then uses its file lookup service 302 to obtain the latest version of the VEC binary file that is stored on the partner server 202. The VEC binary file is then transmitted to the host device 102 where it is flashed into the memory space 104 designated for the NanoKernel Application 303 and VEC binary 304.

FIG. 6 illustrates a PID lookup table mapping codes and descriptions for use by a vehicle diagnostic system of FIG. 4. In certain embodiments, the binary file downloaded from the service provider server 202 and generated from the master server 201 includes a PID lookup table 600. The lookup table 600 can be formatted as a part of the binary file and can be accessed via the NanoKernel Application 104 in response to a request for information. In particular, the NanoKernel Application 104 can map a generic request to a particular description in the description column 603. This can be mapped via one or more algorithms analyzing the text of the generic request, such as a string searching algorithm (including approximate string searching) and a pattern recognition algorithm, where the algorithm matches words in a request to the closest description string. Once the description is identified, it corresponds to a PID Name and/or PID ID. The NanoKernel Application 104, will access one or more control modules of the vehicle 101 to obtain data from the appropriate control module having a value for the PID Name and ID identified. The value obtained from the one or more control modules of the vehicle will be stored and transmitted to the service provider server 202 or to another application located on the host device 102. The value obtained corresponds to vehicle operational data from the vehicle control module, such as vehicle odometer reading, oil life, tire pressure, seatbelt status, fuel level, airbag status, transmission gear position, brake status, vehicle speed and engine speed. The vehicle operational data can be provided in a generic request specifying and requesting, for example, engine rotational speed or RPMs. In certain implementations, the value will need to be resolved. Resolving the value may include accessing the master vehicle diagnostic server 201 or accessing a file transmitted from the master vehicle diagnostic server 201 to the service provider server 202. Other vehicle information 604 not having a particular PID code may be integrated into the lookup table or more than one lookup table may be included in the bin file. For example, other information may be mapped for request such as causing the horn to honk, turning on the lights or performing other vehicle functions, where those functions don't have a PID code.

Figure 7A:
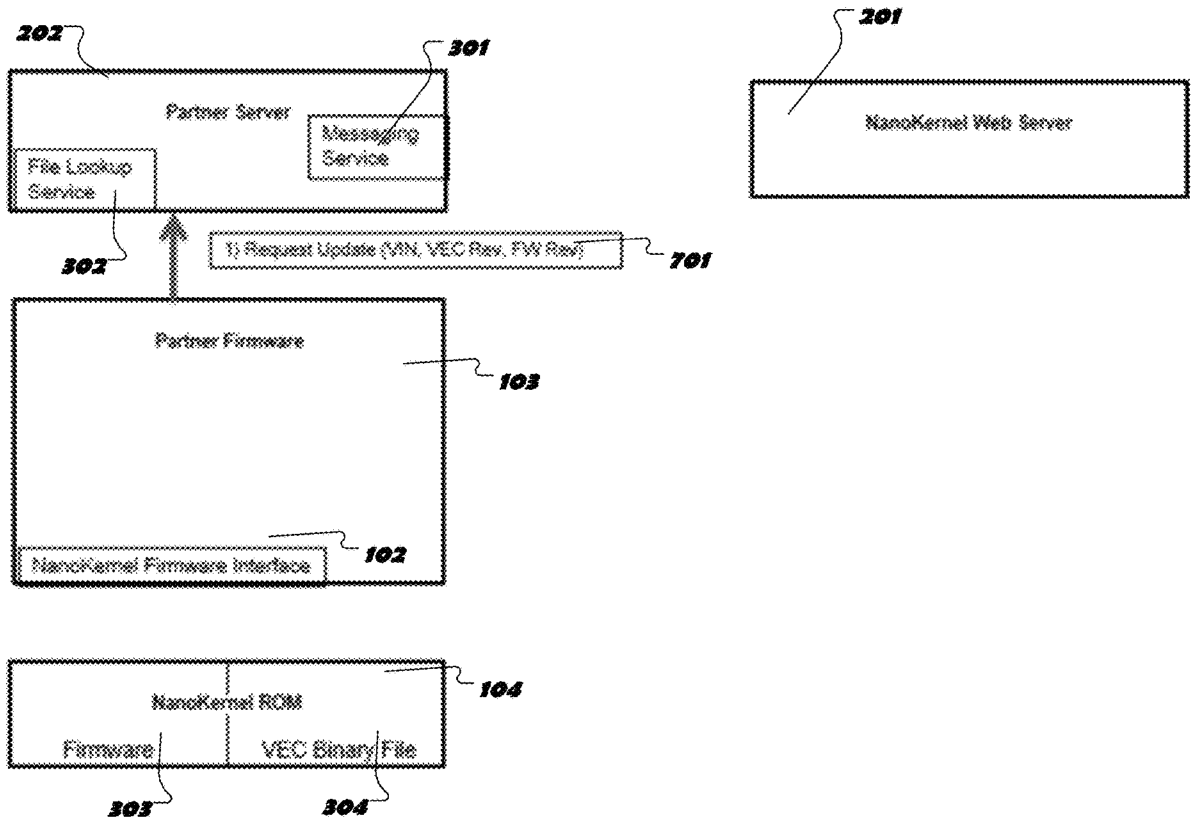
FIG. 7A-7B show the system architecture of FIG. 4 at device update interphase.
Figure 7B:
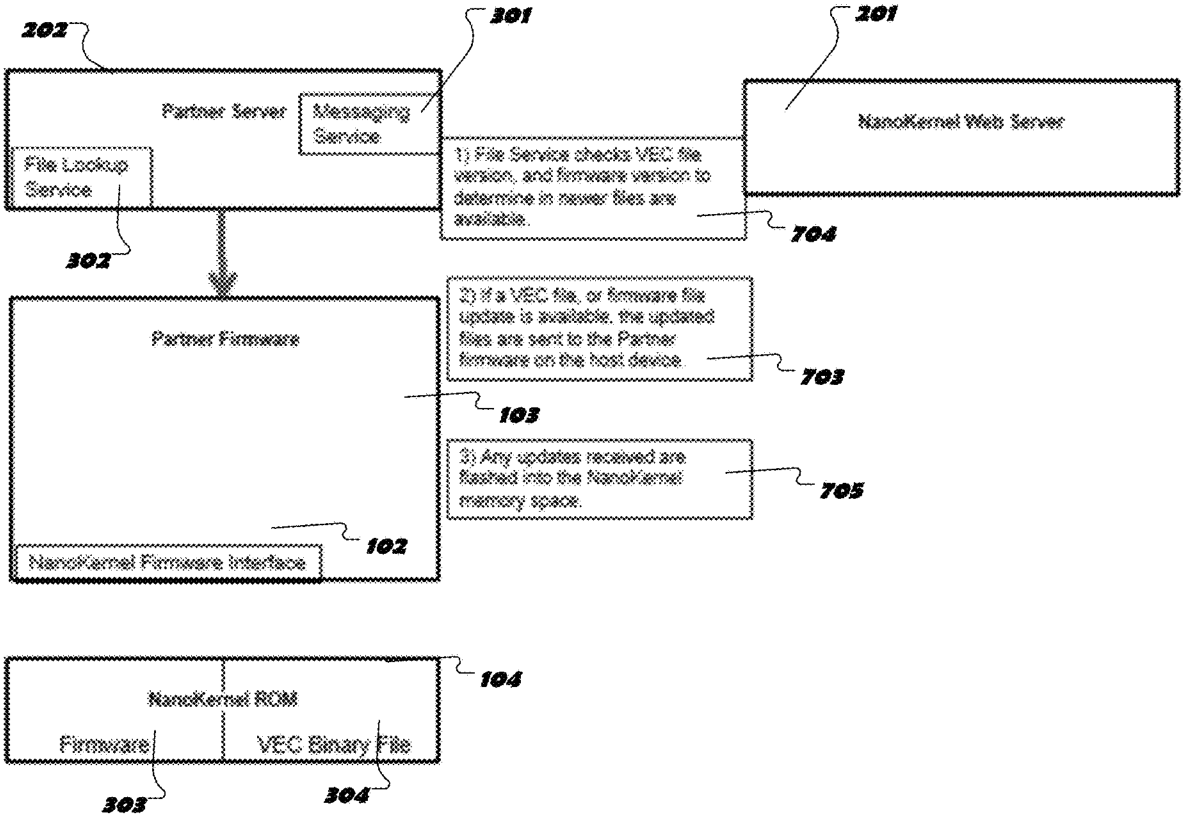

FIG. 7A-7B show the system architecture of FIG. 4 at a device update interphase. As shown in FIG. 7A, the host device 102 can request updates 701 for the bin file 304, for example each time the vehicle is started. As shown in FIG.

7B, the service provider server 202 can pole the master server 201 for updates. The master server will either respond with a no update response 704 or with a reply 703 that includes any updated VEC file obtained since the last update request was received from the partner server 202 for the VIN number specified in the request. If a new VEC file is available, the VEC file will be stored on one or more storage devices on the host device 102.

Figure 8:
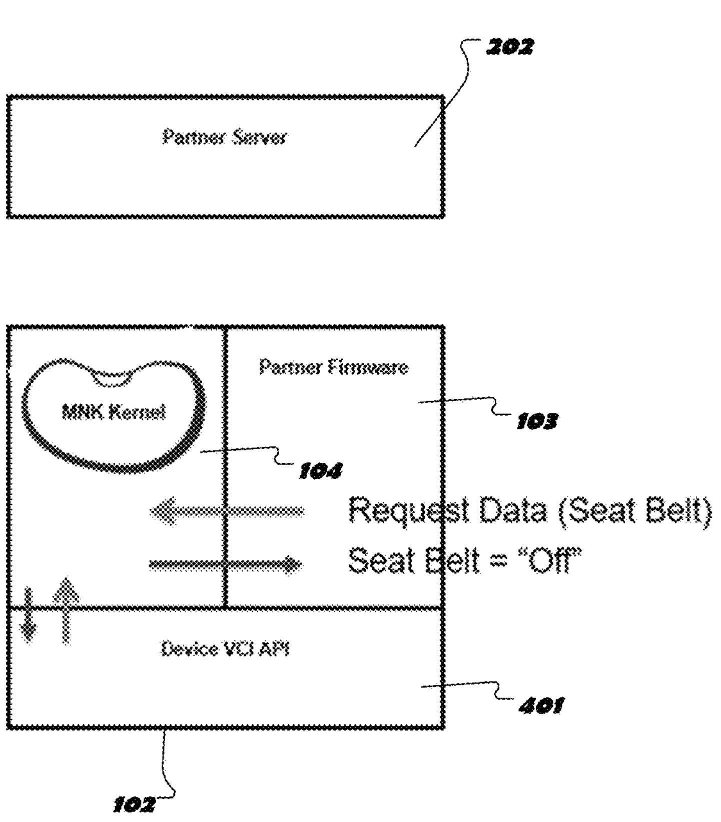
FIG. 8 shows the system architecture for a vehicle diagnostic system operating to a request for vehicle information.

FIG. 8 shows the system architecture for a vehicle diagnostic system operating to obtain a request for vehicle information, such as a diagnostic request, once the nanokernel application 104 is properly configured for the vehicle. In certain implementations, after the device 102 has been appropriately identified and vehicle data discovered and updated on the host device 102 a user can remotely request information such as the status of a seat belt in the vehicle 101. In certain embodiments, the status of the seat belt can be requested in parallel with or in response to determining that an engine speed is above a certain threshold. The seatbelt request is transmitted from the service provider server 202 to service provider firmware or application 103 running on the host device. The application 103 transmits the command to the NanoKernel Application 104 installed and updated on the host device 102. The NanoKernel Application 104 resolves the request, for example by determining the appropriate PID command and/or ID to request from the vehicle. The appropriate PID command can be determined by mapping one or more terms and/or letters in for example a generic request to an appropriate value in a PID table (as shown in FIG. 7). The appropriate PID command is requested by the NanoKernel Application 104 from the vehicle 101, via interface 401 connected to the host device 102 via the electrical connector. The interface 401 can be used to access one or more vehicle buses or control units. The PID command obtains data from one or more vehicle control units via vehicle communication interface 401 and passes that data to the NanoKernel Application 104 for transmission to the service provider server 202 via the service provider application 103.

Implementations of the subject matter and the operations described in this specification can be implemented by digital electronic circuitry, or via computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Implementations of the subject matter described in this specification can be implemented in a computing system that includes a back end component, e.g., as a data server, or that includes a middleware component, e.g., an application server, or that includes a front end component, e.g., a user computer having a graphical display or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some implementations, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary implementations, and that such variations are intended to be encompassed by the present disclosure. It is recognized that features of the disclosed implementations can be incorporated into other disclosed implementations.

While various inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way. Accordingly, implementations may be constructed in which acts are performed in an order different than illustrated, which may include performing some acts simultaneously, even though shown as sequential acts in illustrative implementations.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A vehicle diagnostic system comprising:

a housing structure;

an electrical connector that is at least one of coupled to and extending from a portion of the housing structure; and one or more computers and one or more storage devices positioned in the housing structure and communicably coupled to the electrical connector, the one or more storage devices comprising stored instructions that are operable, when executed by the one or more computers, to cause the one or more computers to perform operations comprising:

determining a vehicle identification number (VIN) for a vehicle connected to the electrical connector;

identifying, based on the VIN, a vehicle electronic configuration (VEC) file from the one or more storage devices;

receiving, from a remote server, a request, wherein the request is a generic text request for vehicle operational data;

in response to receiving the request:

mapping, by the one or more computers and using the VEC file, the request to a parameter identification (PID) code;

determining a vehicle control module to access based on the mapping;

obtaining raw data associated with the mapped PID code containing the vehicle operational data from the vehicle control module based on the mapping; and causing the raw data containing the vehicle operational data to be transmitted to the remote server.

2. The vehicle diagnostic system of claim 1, wherein the stored instructions are configured as nanokernel firmware.

3. The vehicle diagnostic system of claim 1, wherein the electrical connector comprises an on-board diagnostic (OBD) connector.

4. The vehicle diagnostic system of claim 1, wherein the stored instructions are further operable when executed by the one or more computers, to cause the one or more computers to perform operations comprising causing an output command to be sent to the vehicle control module.

5. The vehicle diagnostic system of claim 1, wherein the stored instructions are stored in 100 kb or less of memory on the one or more storage devices.

6. The vehicle diagnostic system of claim 1, wherein the stored instructions are stored in 64 kb or less of memory on the one or more storage devices.

7. The vehicle diagnostic system of claim 1, wherein the one or more storage devices comprising stored instructions that are operable, when executed by the one or more computers, to cause the one or more computers to perform operations further comprising storing the VEC file on the one or more storage devices.

8. The vehicle diagnostic system of claim 7, wherein the VEC file is configured to be engaged with an operating system stored on the one or more storage devices and to engage the vehicle control module via a vehicle communication interface (VCI) so as to obtain the vehicle operational data and store the vehicle operational data on at least one of the one or more storage devices.

9. The vehicle diagnostic system of claim 8, wherein the VEC file is a first VEC file and further comprising replacing the first VEC file stored on the one or more storage devices with a second VEC file distinct from the first VEC file.

10. The vehicle diagnostic system of claim 9, wherein replacing the first VEC file stored on the one or more storage devices with the second VEC file is in response to a change in the VIN.

11. The vehicle diagnostic system of claim 1, wherein the VEC file comprises strings and logic for a plurality of parameter identification (PID) codes, wherein the mapped PID code is selected from the plurality of PID codes.

12. The vehicle diagnostic system of claim 1, wherein the request comprises a device identification number for the vehicle diagnostic system.

13. The vehicle diagnostic system of claim 1, wherein the one or more computers are configured to receive the request directly from the remote server.

14. A method of obtaining vehicle diagnostic data comprising:

determining a vehicle identification number (VIN) for a vehicle connected to an electrical connector of a vehicle diagnostic system;

identifying, based on the VIN, a vehicle electronic configuration (VEC) file from one or more storage devices of the vehicle diagnostic system;

receiving, from a remote server, a request, wherein the request is a generic text request for vehicle operational data;

in response to receiving the request:

mapping, by the vehicle diagnostic system and using the VEC file, the request to a parameter identification (PID) code;

determining a vehicle control module to access based on the mapping;

obtaining raw data associated with the mapped PID code containing the vehicle operational data from the vehicle control module based on the mapping; and causing the raw data containing the vehicle operational data to be transmitted to the remote server.

15. The method of claim 14, wherein obtaining the vehicle operational data comprises obtaining a diagnostic trouble code (DTC).

16. The method of claim 15, wherein mapping the PID code in response to receiving the request comprises mapping one or more words in the request to a PID name.

17. The method of claim 15, wherein mapping the PID code in response to receiving the request comprises scanning a lookup table including a plurality of PID codes.

18. The method of claim 15, wherein the PID code corresponds to at least one of vehicle odometer reading, oil life, tire pressure, seatbelt status, fuel level, airbag status, transmission gear position, brake status, vehicle speed and engine speed.

19. The method of claim 15, wherein mapping the PID code in response to receiving the request comprises resolving a list of standardized terms in the request and mapping a standardized term in the list of standardized terms to a PID code selected from a plurality of PID codes.

20. One or more non-transitory computer-readable storage media encoded with instructions that, when executed by one or more computers, cause the one or more computers to perform operations comprising:

determining a vehicle identification number (VIN) for a vehicle connected to an electrical connector of a vehicle diagnostic system;

identifying, based on the VIN, a vehicle electronic configuration (VEC) file from one or more storage devices associated with the vehicle diagnostic system;

receiving, from a remote server, a request, wherein the request is a generic text request for vehicle operational data;

in response to receiving the request:

mapping, by the one or more computers and using the VEC file, the request to a parameter identification (PID) code;

determining a vehicle control module to access based on the mapping; and obtaining raw data associated with the mapped PID code containing the vehicle operational data from the vehicle control module based on the mapping; and causing the raw data containing the vehicle operational data to be transmitted to the remote server.

* * * * *